United States Patent [19]

Rusis

[11] Patent Number: 5,339,434
[45] Date of Patent: Aug. 16, 1994

[54] HETEROGENEOUS DATA TRANSLATION SYSTEM

[75] Inventor: Edvin A. Rusis, El Segundo, Calif.
[73] Assignee: TRW Inc., Redondo Beach, Calif.
[21] Appl. No.: 986,214
[22] Filed: Dec. 7, 1992
[51] Int. Cl.⁵ .................. G06F 15/16; G06F 13/38
[52] U.S. Cl. ..................... 395/700; 364/DIG. 1; 364/228; 364/280.4; 364/284.3
[58] Field of Search ............... 364/DIG. 1 MS File; 395/700

[56] References Cited

U.S. PATENT DOCUMENTS 5,067,072 11/1991 Talati et al. ............... 364/DIG. 1
5,142,681 8/1992 Driscoll et al. ............. 395/700
5,175,817 12/1992 Adams et al. ............. 364/DIG. 1

*Primary Examiner*—Thomas M. Heckler
*Attorney, Agent, or Firm*—G. Gregory Schivley; Robert W. Keller

[57] ABSTRACT

A method and apparatus facilitating the exchange of data between application programs written in a higher level language and running on separate heterogeneous computer platforms, without concern for possible differences in internal data formats in the separate platforms. Each message format to be the subject of exchange among heterogeneous computer platforms is preregistered with each such platform by writing and executing a computer program that contains a definition of the message format in the higher level language. Preregistration produces a message description file in each platform, which is used at initialization time to generate a field descriptor tree in each platform. When a message is to be transmitted, it is first translated to a universal meta format, making use of the field descriptor tree, and on receipt at another platform is translated back to the native format of the receiving platform. Thus, data messages are exchanged without concern for the internal data formats used by the separate platforms.

10 Claims, 7 Drawing Sheets

```
-- Define message component types
type Dollars is delta 0.1 range -1_000.0 .. 1_000.0;

type Decimal_Hours is digits 6 range 0.0 .. 8544.0

-- Define message record
type Employee_Message is record
   Name    : String (1 .. 13);
   Age     : Natural;
   Salary  : Dollars;
   Hours   : Decimal_Hours;
   Breaks  : Duration;
end record:

-- Define message ID
Employee_Message_Id : constant Natural :=1;
```

FIG. 2

FIG. 3A (36 bytes)

FIG. 3B (40 bytes)

HETEROGENEOUS DATA TRANSLATION SYSTEM

BACKGROUND OF THE INVENTION

This invention relates generally to information exchange between computers of different types and, more particularly, to information exchange in computer networks, between computers of different types, using various higher order programming languages. These languages, such as Ada, C, and C++, provide highly convenient programming tools for computer users developing various application programs. Basically, a high level programming language allows a programmer to condition a computer to perform desired data input, data output, logical and mathematical operations, without the programmer having to be concerned with details of the computer hardware and how it operates to perform these functions. Typically, complex application programs are written in a higher order language using statements resembling an English-language description, and then "compiled" by other programs called compilers, which translate the original higher order statements into a lower level language that is directly executable by the computer, and is usually referred to as the object language or the machine language.

Each higher order language provides strict standards for defining composite data types that may be used in an application program. Data types may include records, arrays and other structures. A difficulty arises because none of these languages provides for any standard internal machine representation of the data structures. The same or different compilers used on different computers, sometimes referred to as "platforms," may result in different internal data formats for the same data. Different compilers used on identical platforms may also result in different internal data formats. The different internal data formats would be of no concern if the computer systems that used them had no need to communicate with each other, but the trend in computer systems is for greater levels of interconnection, usually through computer networks of various configurations. When information is to be exchanged between computer applications that employ different internal data representations and layout in computer memory, some form of data format conversion is required.

Prior to this invention, the burden for data translation has been placed on the users of the incompatible systems, who must call separate services to encode and decode basic data field types or to define messages in a separate language syntax that will be used for information exchange. These prior approaches do not provide transparent data exchange between platforms, and impose a significant translation overhead on the systems involved. Moreover, programs that are configured in this way to perform translation for communication with heterogeneous systems cannot be readily moved to different platforms involved in communication with similar (i.e. homogeneous) systems.

Ideally, what is needed is a technique that allows each compiled application program to exchange data in terms of its own "native" language composite data types. Each compiled program should be able to exchange data transparently with programs running on other platforms, without regard for differences in internal data format that may exist between the platforms. The present invention accomplishes this goal.

SUMMARY OF THE INVENTION

The present invention resides in a method and apparatus for facilitating exchange of data between application programs written in a higher level language and running on separate heterogeneous computer platforms, without concern for possible differences in internal data formats in the separate platforms. Briefly, and in general terms, the method of the invention comprises the steps of preregistering each message format with each of the platforms that will be involved in the exchange of data; initializing each platform to contain field descriptors for each message format preregistered with the platform; prior to transmission of a message from a platform, translating the message from its native format to a universal format, referred to as a meta format, using the field descriptors obtained from preregistering the message format; transmitting the message in meta format from one platform to another; receiving the message at another platform; and translating the received message from the meta format to the native format of the receiving platform, using the field descriptors obtained from preregistering the message format. In this manner, application programs running on heterogeneous platforms can communicate conveniently without regard to possible differences in internal message and memory formats. Preregistration of message formats poses only a minor inconvenience, and renders the communication process completely transparent to the user.

Basically, preregistration comprises the steps of writing a program that includes a definition of each message format to be involved in communication between platforms; compiling and executing the program on each platform, to produce a message description file; and then storing the message description file for later use. The initializing step includes retrieving the stored message description file, and generating a field descriptor tree from the message description file. The field descriptor tree is stored in quickly accessible memory, in a form that minimizes data manipulations during the translating steps of the method.

In terms of apparatus, the invention comprises means for preregistering each message format with each of the platforms that will be involved in the exchange of data; means for initializing each platform to contain field descriptors for each message format preregistered with the platform; and means for use prior to transmission of a message from a platform, for translating the message from its native format to a meta format, using the field descriptors obtained from preregistering the message format. The apparatus further includes means for transmitting the message in meta format from one platform to another; means for receiving the message at another platform; and means for translating the received message from the meta format to the native format of the receiving platform, using the field descriptors obtained from preregistering the message format.

It will be appreciated from the foregoing summary that the present invention represents a significant advance in the field of interconnected heterogeneous computer systems. The invention permits application programs running in such systems to exchange data without regard for differences in internal data structure and format. Other aspects and advantages of the invention will become apparent from the following more detailed description, taken in conjunction with the accompanying drawings.

BRIEF DESCRIPTION OF THE DRAWINGS

FIG. 2 is textual listing of a portion of an illustrative message format in Ada language;

FIGS. 3A and 3B are internal message formats for the message defined in FIG. 2, after compilation in platforms A and B, respectively;

DESCRIPTION OF THE PREFERRED EMBODIMENT

Figure 1:
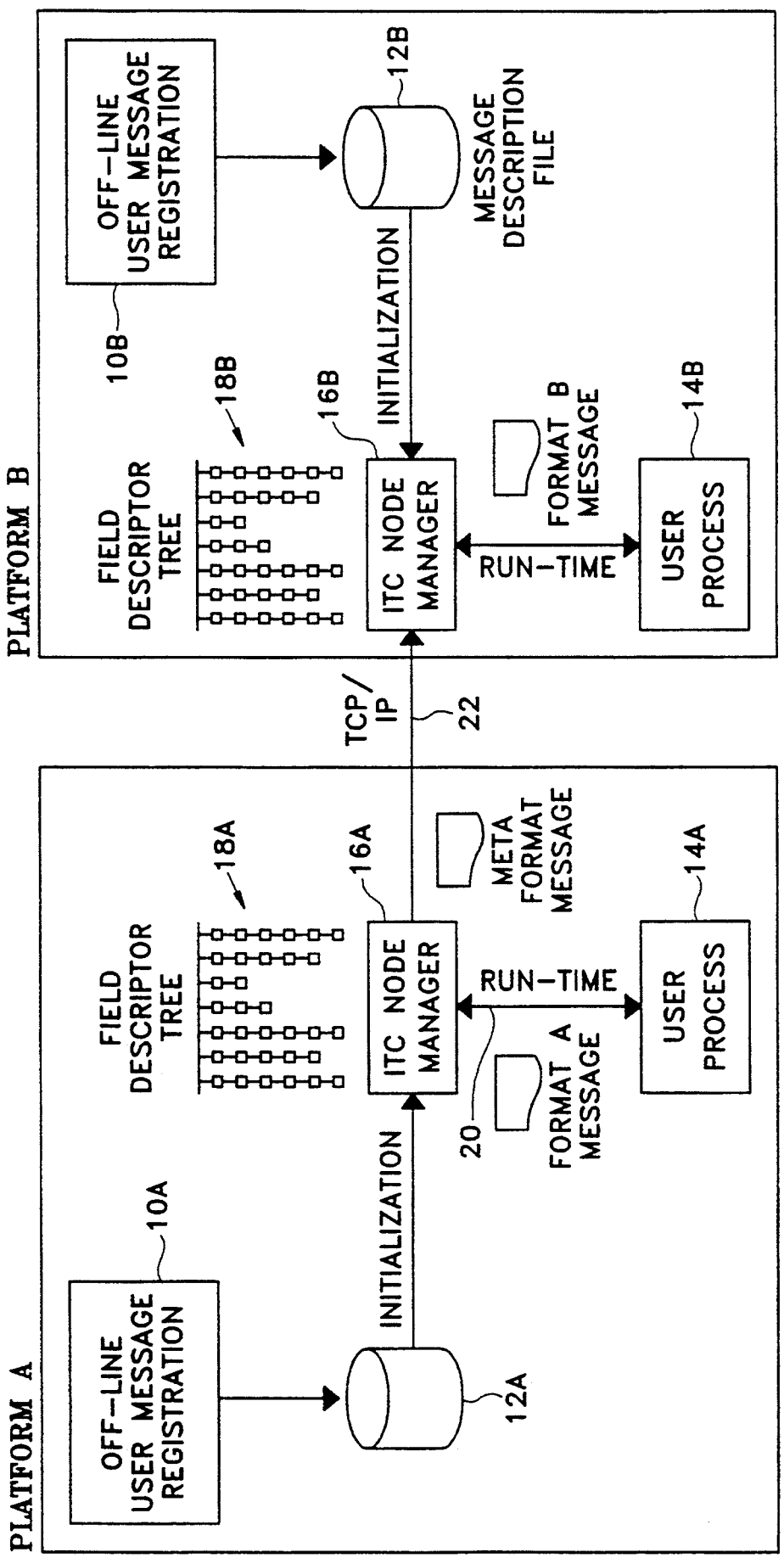
FIG. 1 is a block diagram illustrating the basic principles of the invention.

As shown in the drawings for purposes of illustration, the present invention is concerned with a technique for facilitating the exchange of data between computers, sometimes referred to as "platforms," without regard to differences between internal data formats used by compiler languages running on the different platforms. A higher order programming language, such as Ada, C or C++, in general will employ different internal data formats when running on different computer platforms, and different compilers running on identical platforms may also employ different internal data formats. Therefore, in order for application programs running on different platforms to exchange data, some form of data translation is required. In the past, the burden for any required data translation has been placed on the users of the systems, to call separate services to encode or decode data field types, or to define data exchange messages in a prescribed separate language syntax.

The present invention provides a platform-independent and compiler-independent data record translation system, which can be conveniently incorporated into a message routing communications server associated with each computer of a heterogeneous network. A key aspect of the invention is that, for each platform, a description of each user message format is generated off-line, using a set of utility programs for this purpose. These programs are compiled and executed once for each of all of the target platforms involved, so that compiler-dependent data representation information can be extracted from each compiler. As will be further explained, the results of running these utility programs are stored in a disk file and made available to the computer's message routing server for incorporation into a memory-resident field descriptor database. At runtime, when an application program wishes to transmit data to another platform, the previously stored field descriptors are used to translate the message data from the sending platform's native format to a universal format referred to as a meta format, for transmission onto the network. A platform receiving the message translates it into the receiving platform's native format, using the field descriptors previously stored for that platform. Neither the sending application program nor the receiving application program is aware of any format translation.

FIG. 1 illustrates the invention diagrammatically and shows the principal components involved in two platforms, designated platform A and platform B. Each platform has an off-line user message registration process, indicated at 10A and 10B, respectively, and includes a hard disk, 12A, 12B. The principal processing module for communication between two user processes 14A, 14B, is referred to as the ITC (intertask communication) module 16A, 16B. Prior to operating either of the platforms in a network, the user registration process 10A, 10B is executed, and produces a message description file that completely defines the internal message format for a platform and compiler combination. The message description file is stored on the hard disk 12A, 12B for all future uses. When a platform is first installed on a network, one of the initialization functions is to retrieve the message description file from the hard disk 12A, 12B, and to store it in computer memory in the form of a field descriptor tree 18A, 18B. The field descriptor tree contains the same information as the message description file, but in a form that is most readily usable during communication operations of the platforms.

If, for example, a user process 14A in platform A has message data to transmit to platform B, the user process transmits the data over line 20A in its own ("native") format, without regard to any special destination requirements. In the ITC node manager 16A, information from the field descriptor tree 18A is used to effect a translation of the message data to the meta format, which is transmitted over line 22 to platform B. It will be understood that the line 22 may include a complex computer network through which the message is routed before reaching its ultimate destination. In platform B, the received message is translated by the ITC node manager 16B to the platform's native format, using information in the field descriptor tree 18B. The message data in this native format for platform B is transmitted in turn to the destination user process 14B.

An example showing two different memory representations of the same data record should help to clarify the functions preformed by the invention. FIG. 2 is an example of source code in the Ada language, defining an employee record referred to as Employee_Message. The source code defines the record as including:

Name: 13 characters (ASCII bytes)
Age: integer quantity
Salary: dollars, range −1,000.0 to 1,000.0 (fixed point)
Hours: six decimal digits, range 0.0 to 8544.0 (floating point)
Breaks: time quantity (fixed point)

As shown in FIGS. 3A and 3B, this record may have two quite different internal formats on two different target platforms. The memory formats for the two platforms are shown as consisting of multiple words of thirty-two bits, or four bytes, each. For both platforms A and B, the Name field is represented in the same format, as thirteen consecutive bytes. However, all the other fields are located in different relative locations. For example the Age field appears in bytes #16 through #19 in FIG. 3A, but in the bytes #14 and #15 in FIG. 3B. Also, the field is reversed in FIG. 3B, with the least significant bit (LSB) appearing first instead of the most significant bit (MSB). Similarly, the Salary field in FIG.

3B appears in a different relative location, has a different field length, and has the MSB and LSB reversed, as compared to FIG. 3A. The Hours field also appears in a different starting location in FIG. 3B, and has a different internal floating-point format. The Breaks field is also different in starting location and position of the MSB/LSB. The overall length of the Employee_Message record is 32 bits longer in FIG. 3B than in FIG. 3A.

Figure 4:
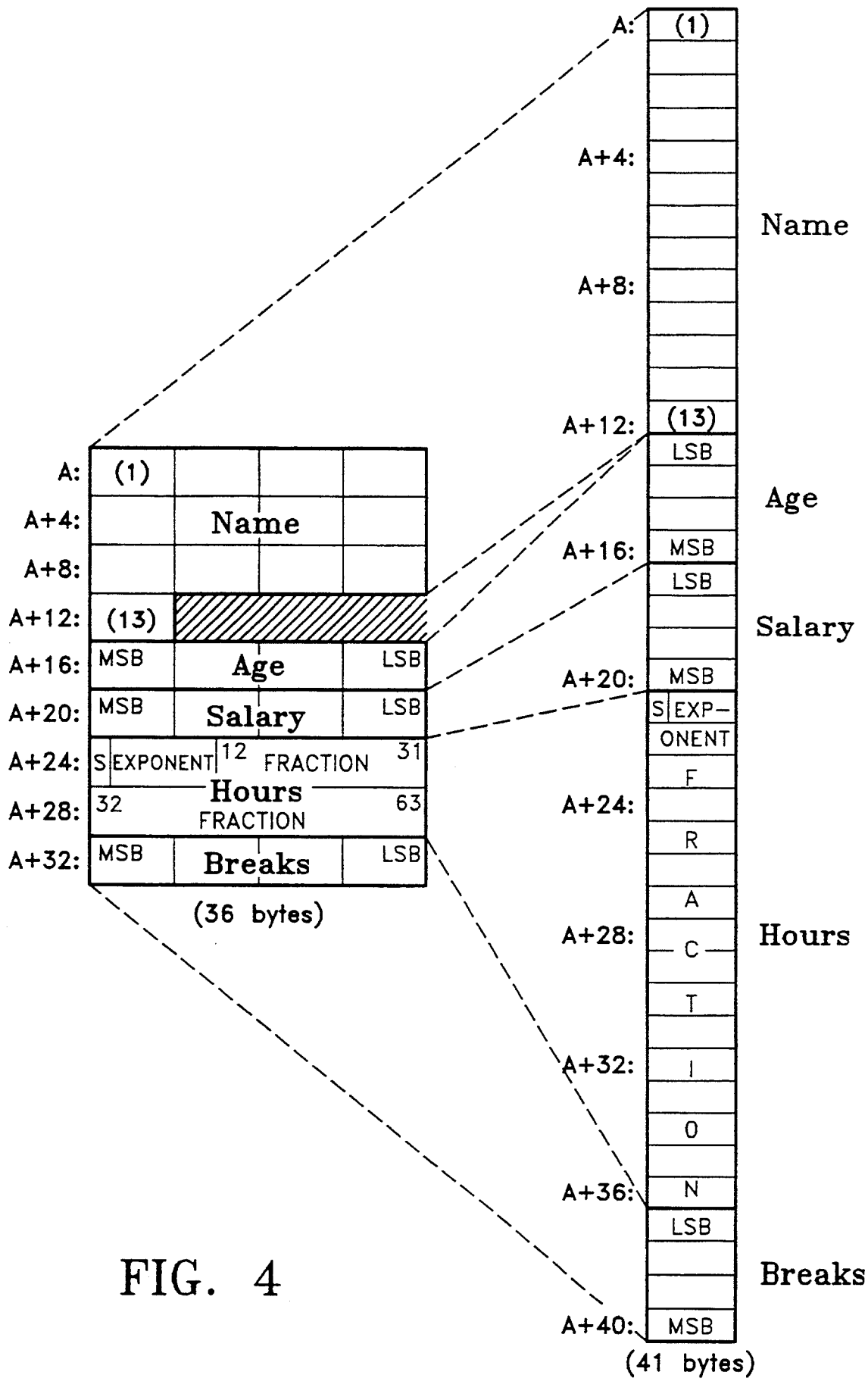
FIG. 4 is a diagram showing translation from the internal message format of platform A to a meta format.
Figure 5:
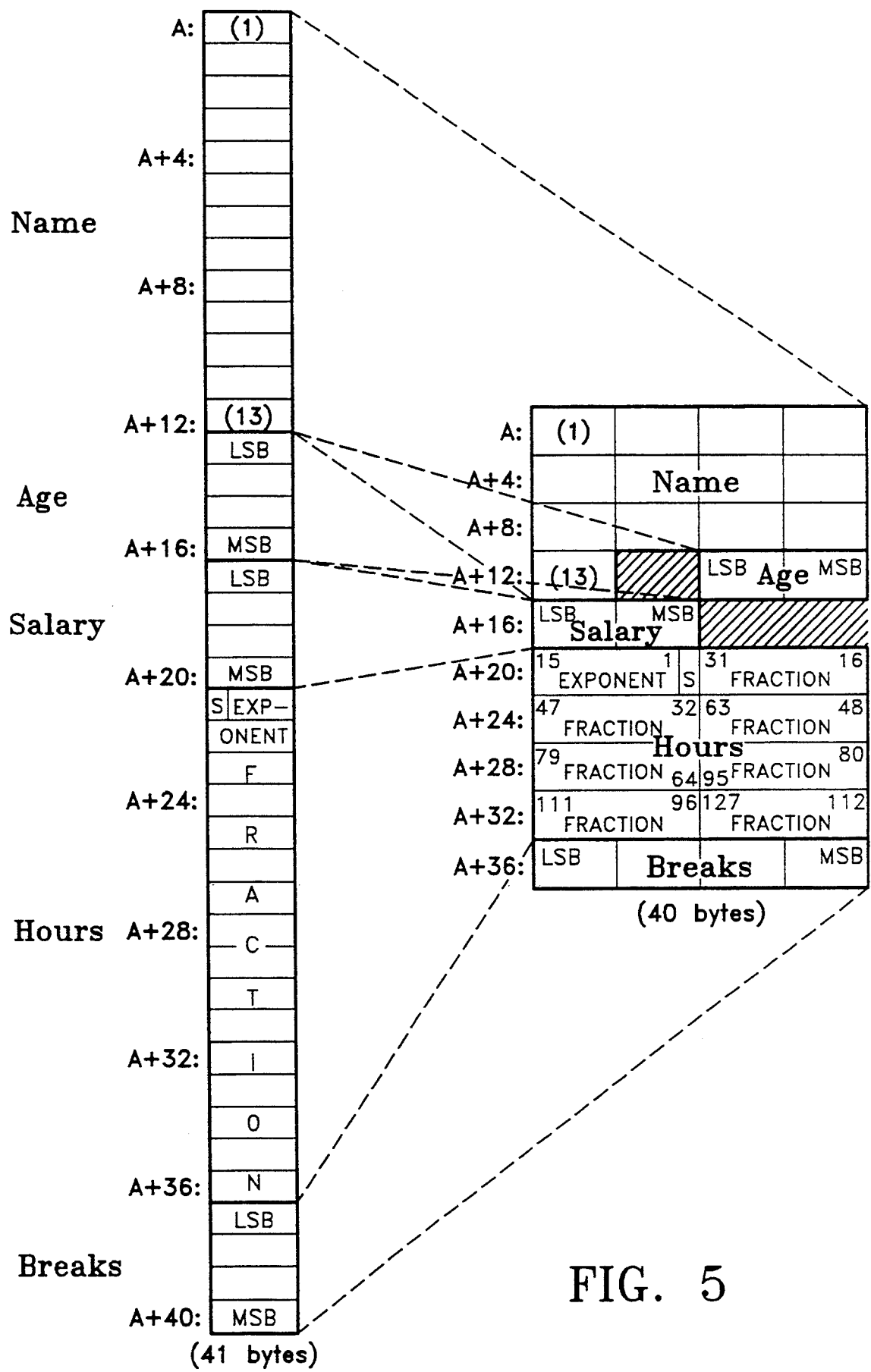
FIG. 5 is a diagram showing translation from the meta format to the internal message format of platform B.
Figure 9A:
FIG. 9A is a block diagram depicting the function of translation from A-format to meta-format.
Figure 9B:
FIG. 9B is a block diagram depicting the function of translation from meta-format to B-format.

In accordance with one aspect of the invention, data messages are exchanged in the meta format, as shown by way of further example in FIG. 4 and FIG. 5. FIG. 4 shows in diagrammatic form the translation from the format of platform A (FIG. 3A) to the meta format, and FIG. 5 shows the translation from the meta format to the format of platform B (FIG. 3B). FIGS. 9A and 9B depict the two phases of the translation process in flowchart form. The rules for the meta format are simple and may be summarized as follows:

1. The meta format has no gaps or holes, and no format or size information is contained in the format.
2. The field order and the sizes of the fields are known at the translation points.
3. All basic type field sizes are fixed in the meta format, except for character strings.
4. Integer based values appear in four-byte fields and the LSB appears first in the data stream.
5. Character strings are copied without change from the source format.
6. Floating-point values are expanded to 128 bits (16-bit exponent and sign, 112-bit fraction), and appear with the MSB first in the data stream.

Translation from the meta format to the platform B format is shown in FIG. 5. The field byte order is set to match the target platform, and individual fields may have to be expanded or truncated, based on the representation required by the target language compiler.

Figure 6:
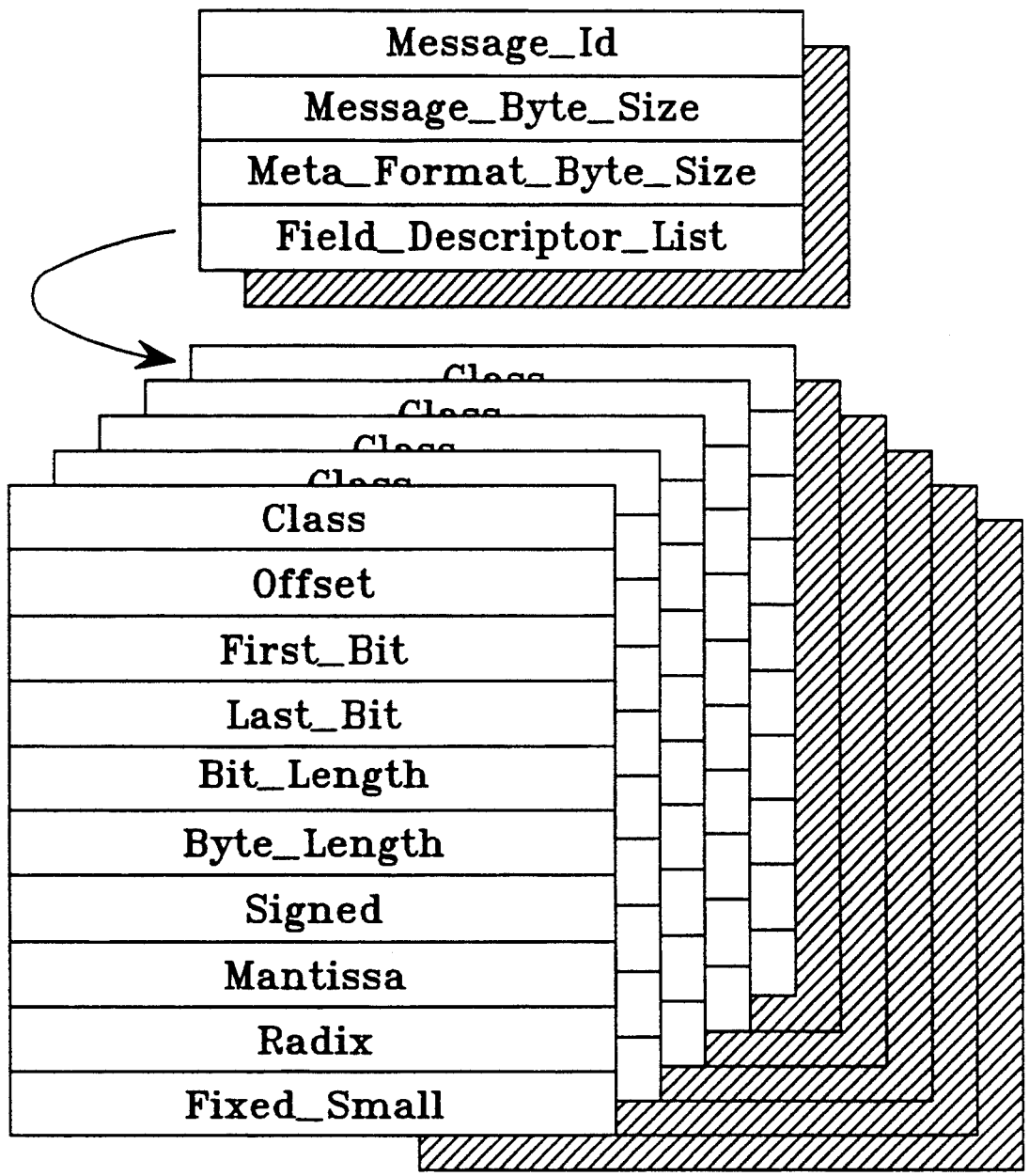
FIG. 6 is a diagram showing the general content of the field desriptor tree for a particular message.

The information contained in the field descriptor tree 18 (FIG. 1), is shown diagrammatically in FIG. 6. For each type of message that may need to be translated, the tree 18 contains a complete definition of the message format, both the local compiler representation (the native format) and the meta format representation. Each different message type is identified by a message identifier field, and includes a Message_Byte_Size parameter, a Meta_Format_Byte_Size parameter, and a Field_Descriptor_List, which is a pointer to a list of field descriptor records, one of which is shown in the lower part of the figure.

Each field descriptor record completely defines one data field of the message, including the type of data, position of the first and last bits, and so forth. When the ITC node manager 16 performs a translation to or from the meta format, it accesses this information in the field descriptor tree to determine where to locate and how to interpret specific data fields in the message being translated.

Figure 8:
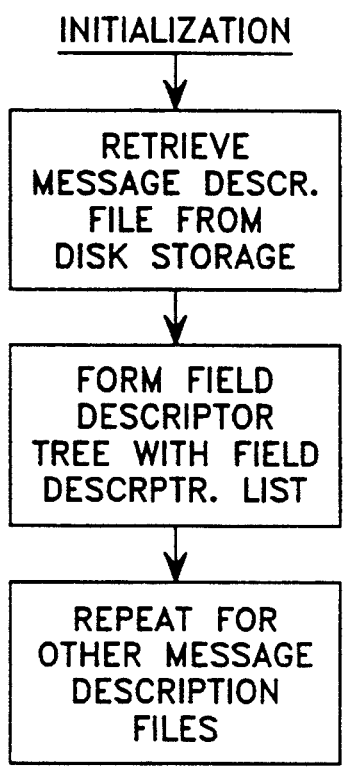
FIG. 8 is a block diagram depicting the function of initialization of a field descriptor tree.

As mentioned earlier, the field descriptor tree 18 is formed during an initialization phase, using information previously stored in the message description file during the off-line preregistration operation. The off-line operation is simply an analysis of each of the messages, using the appropriate compiler and platform. For example, a program that included the Employee_Message of FIG. 2 would be compiled using the Ada compiler in each of the platforms A and B, and the resulting message formats would then be analyzed by the off-line programs, and the results stored in the message description files of the two platforms. During initialization of the system, the message description files are read by the respective systems and the field descriptor trees 18 are formed for immediate access in processing messages that require translation. FIG. 8 depicts the initialization functions in flowchart form.

If the same data message is to be used in additional platforms, the required registration process requires little additional effort on the part of the user. The same source-language program including the message is compiled on each of the other platforms, and run to obtain a message description file for each platform. If the same message is to be used on a platform using a different compiler, then a program in the different language, and including the message, will need to be compiled to obtain an appropriate message description file for that particular platform and compiler combination.

The principal advantage of the invention is that it does not require the user to learn any separate data definition language. Data descriptions and application programs are written in the same programming language. Moreover, the user is allowed to use composite data types that are natural to the programming language, without any required knowledge of internal compiler or machine memory representation of the data. The only requirement imposed on the user is to write a simple program, separate from the application program, to call the message description services. These services examine a sample message, and then generate and store the message description file for later use. The description program need only be written once for each higher level language used, and then compiled and executed on each platform using the language.

Since message description is independent of the application programs, relocation of existing programs (to other platforms) can be effected without modification of the programs. Also, programs that were constructed to communicate heterogeneously under the present invention can be moved to homogeneous machines without modification, and translation is avoided.

Another advantage of the invention is that the meta format representation contains only user message data and a standard message header. No data field size or data field type information is transmitted with the meta format message. This reduces the size of the actual message transmitted and increases communication throughput. A related advantage is that the meta format representation is binary and as close as possible to the various formats used in the different machine architectures. This reduces the amount of data translation required. Similarly, the message descriptors stored in memory for use at runtime have been preprocessed at initialization time, to reduce translation processing time.

Figure 7:
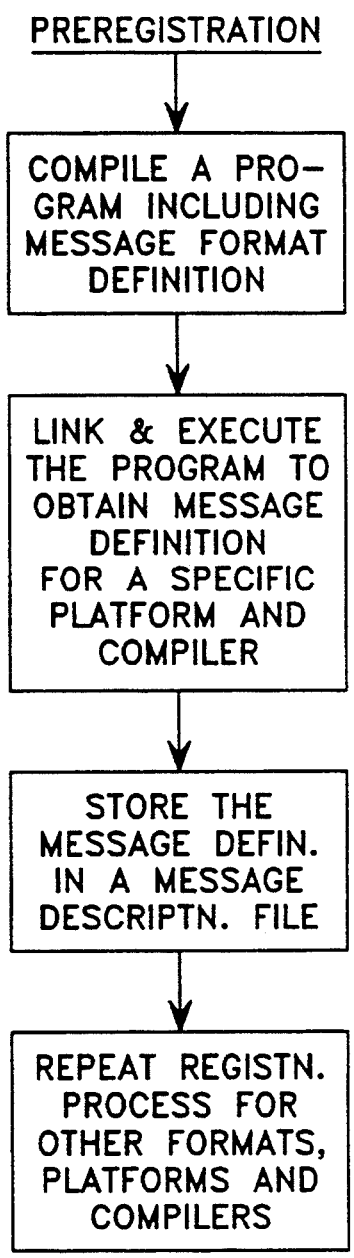
FIG. 7 is a block diagram depicting the function of format preregistration.

The specific nature of the utility programs used to generate message description files will depend on the programming language used. FIG. 7 depicts the steps of the message format pregistration process in general terms. In the Ada language, generating a message description is accomplished by building a standalone Ada program that includes descriptions of all the messages, and calling services to analyze these descriptions and generate message description files. The first and last services to be called are Begin_Message_Definition and End_Message_Definition. These initialize and open a message definition file and "context" at the start of the procedure, and terminate and close the context at the end of the procedure. Within each message definition are field definitions, which may include any of seven field types, as described below.

Define_Discrete_Field is a procedure used to describe any Ada discrete field which has an underlying integer machine representation in two's complement arithmetic. It is used to define fields of the type INTEGER, NATURAL, POSITIVE, CHARACTER (if not part of a STRING), BOOLEAN, any enumerated type, or any universal integer based type.

Define_Duration_Field is a procedure used to describe any message field which has a type of DURATION, including CALENDAR.DAY_DURATION. The duration values that can be transmitted heterogeneously are limited to a range of −86,400 to +86,400, which represents −24 hours to +24 hours, in seconds.

Define_Fixed_Field is a procedure used to describe any message field of the user-defined fixed-point type (except the Duration field referred to above). For example, dollars and cents may expressed in a fixed field.

Define_Float_Field is a procedure used to describe a floating point message field. As noted earlier, the metaformat representation of all floating point fields is a 128-bit format.

Define_String_Field is a procedure used to describe any message field made up of multiple characters.

Define_Time_Field is a procedure used to describe any message field which is of the type CALENDAR.-TIME, or a subtype derived from CALENDAR.-TIME.

Define_Preserved_Field is a procedure used to describe any message field which is to be transmitted heterogeneously unaltered or "as is," to accommodate situations in which the user requires that some data items be transmitted to other platforms without any change at all.

A program is written to include all of the needed message and field definitions, and to call the heterogeneous utility services. The program is compiled, linked and executed on the platforms that will participate in heterogeneous data exchange. The compiling step extracts all the necessary format information for each platform's internal representation of message data, and the step of running the heterogeneous utility services generates a representation of each defined message, for storage in the message description files of each platform.

It will be appreciated from the foregoing that the present invention represents a significant advance in the field of interconnection of heterogeneous computer systems. In particular, the invention provides a convenient technique to allow application programs running on separate, heterogeneous platforms to exchange data messages without regard for any differences in internal data storage formats. It will also be appreciated that, although the invention has been described in detail for purposes of illustration, various modifications may be made without departing from the spirit and scope of the invention. Accordingly, the invention should not be limited except as by the appended claims.

What is claimed is:

1. A method for exchanging data between application programs running on heterogeneous computer platforms having different internal data formats, the method comprising the steps of:
   preregistering each message format with each of the platforms that will be involved in the exchange of data, wherein the step of preregistering a message format generates a definition of the message format in a message description file;
   initializing each platform to contain field descriptors for each message format preregistered with the platform, wherein the initializing step uses the message descriptor files to generate the field descriptors, and each field descriptor completely defines a field in the message format;
   prior to transmission of a message from a platform, translating the message from its native format to a meta format, using the field descriptors obtained from preregistering the message format;
   transmitting the message in meta format from one platform to another;
   receiving the message at another platform; and
   translating the received message from the meta format to the native format of the receiving platform, using the field descriptors obtained from preregistering the message format, whereby application programs running on heterogeneous platforms can communicate without regard to possible differences in internal message and memory formats.

2. A method as defined in claim 1, wherein the step of preregistering each message format includes:
   writing a program that includes a definition of each message format to be involved in communication between platforms;
   compiling and executing the program on each platform, to produce a message description file; and
   storing the message description file for later use.

3. A method as defined in claim 2, wherein the initializing step includes:
   retrieving the stored message description file; and
   generating a memory-resident field descriptor tree from the message description file, for use during the translating steps.

4. A method as defined in claim 1, wherein the step of translating to a meta format includes:
   converting, if necessary, each field of the message to a meta field that is fixed in length for each data type except for character data, and is large enough to accommodate any message field of that type; and
   assembling the converted meta fields into a continuous data stream without gaps.

5. A method as defined in claim 4, wherein the step of converting each field of the message to a meta field includes:
   converting integer based message fields to four-byte meta fields with the least significant bit appearing first;
   converting floating-point message fields to meta fields of 128 bits in length, including a 16-bit exponent and a 112-bit fraction, each with the most significant bit appearing first.

6. Apparatus for exchanging data between application programs running on heterogeneous computer platforms having different internal data formats, the apparatus comprising:
   means for preregistering each message format with each of the platforms that will be involved in the exchange of data, wherein the means for preregistering a message format generates a definition of the message format in a message description file;
   means for initializing each platform to contain field descriptors for each message format preregistered with the platform, wherein the means for initializing uses the message descriptor files to generate the field descriptors, and each field descriptor completely defines a field in the message format;

for use prior to transmission of a message from a platform, means for translating the message from its native format to a meta format, using the field descriptors obtained from preregistering the message format;

means for transmitting the message in meta format from one platform to another;

means for receiving the message at another platform; and means for translating the received message from the meta format to the native format of the receiving platform, using the field descriptors obtained from preregistering the message format, whereby application programs running on heterogeneous platforms can communicate without regard to possible differences in internal message and memory formats.

7. Apparatus as defined in claim 6, wherein the means for preregistering each message format includes:

means for compiling and executing a program written to include a definition of each message format to be involved in communication between platforms, to produce a message description file; and means for storing the message description file for later use.

8. Apparatus as defined in claim 7, wherein the means for initializing includes:

means for retrieving the stored message description file; and means for generating a memory-resident field descriptor tree from the message description file, for use by the means for translating.

9. Apparatus as defined in claim 6, wherein the means for translating the message to a meta format includes:

means for convening, if necessary, each field of the message to a meta field that is fixed in length for each data type except for character data, and is large enough to accommodate any message field of that type; and means for assembling the converted meta fields into a continuous data stream without gaps.

10. Apparatus as defined in claim 9, wherein the means for converting each field of the message to a meta field includes:

means for convening integer based message fields to four-byte meta fields with the least significant bit appearing first;

means for convening floating-point message fields to meta fields of 128 bits in length, including a 16-bit exponent and a 112-bit fraction, each with the most significant bit appearing first.

* * * * *